March 22, 1932.  W. THORNE  1,850,734
GAS ELECTRIC APPARATUS
Filed April 23, 1930
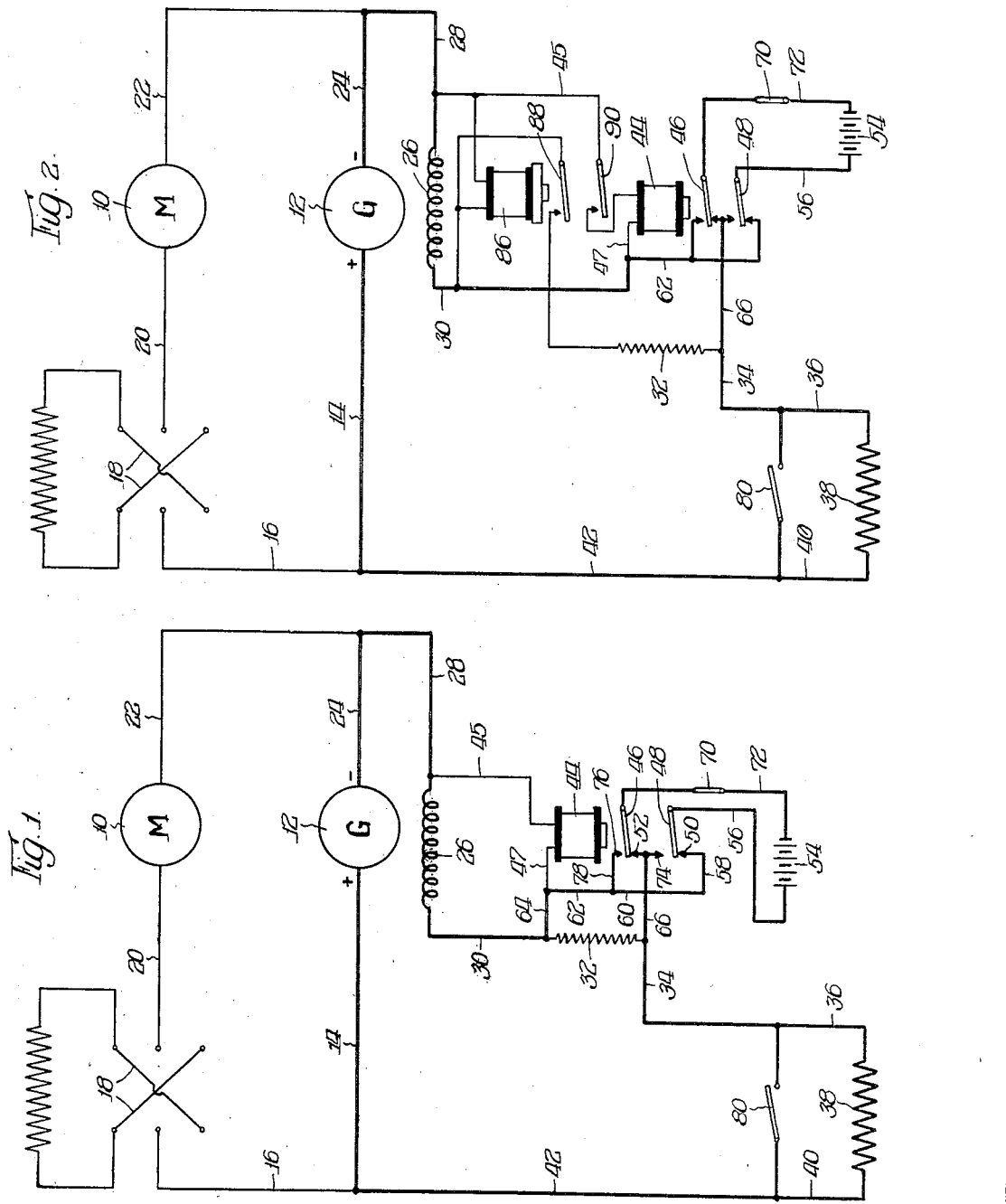
Inventor
Ward Thorne,
By Wilkinson, Huxley, Byron & Knight
attys Patented Mar. 22, 1932

1,850,734

UNITED STATES PATENT OFFICE

WARD THORNE, OF CHICAGO, ILLINOIS, ASSIGNOR TO THORNE MOTOR CORPORATION, OF CHICAGO, ILLINOIS, A CORPORATION OF ILLINOIS

GAS-ELECTRIC APPARATUS

Application filed April 23, 1930. Serial No. 446,508.

This invention relates especially to gas-electric power systems or similar systems in which a generator is driven by mechanical means to furnish electric power for driving a motor, though it may be used with generators connected to other types of loads.

This invention is illustrated as embodied in apparatus for driving a vehicle in which the speed of the generator and the load thereon are both frequently varied, with the result that the generator does not always generate sufficient voltage to properly excite its own field. The illustrated embodiment of this invention includes means for connecting a battery to increase the strength of the field when necessary and at other times to reverse the connections of the battery so that the field current will charge the battery without loss of power.

One object of the invention is to provide means for more quickly accelerating gas-electric vehicles. To this end, means are provided for more quickly building up the generator by the use of an auxiliary field exciting current.

An additional object of the invention is to provide means for charging a battery without loss of power.

Another object of the invention is to provide means whereby a battery can be used to excite a generator field and can thereafter be charged by the current flowing through the field coil.

A further object of the invention is to provide means whereby a battery connected in series with the generator field can have its connections reversed without permitting the generator to break down.

Other objects of the invention will appear from the following description, drawings and claims.

In the drawings, in which like numerals are used for similar parts throughout—

Figure 1 illustrates diagrammatically one embodiment of the invention; and

Figure 2 illustrates a slightly modified form of the invention in which the ballast resistance is not connected until just before the battery connections are reversed.

In Figure 1, one embodiment of the invention has been illustrated as including the motor 10, which according to the usual practice is in driving relation with the wheels. The motor 10 is driven by current supplied by the generator 12. The motor circuit includes the wires 14 and 16, suitable control means 18, wire 20, motor 10 including the usual connections, wire 22 and the wire 24, and back to the generator armature, the wire 14 extending from the positive terminal of the generator 12. The generator 12 is driven by a gasoline engine or other power means and preferably is in direct engagement thedewith. The generator 12 includes a field coil 26 which is preferably shunt wound.

One circuit for the field coil 26 is as follows: From the armature of the generator 12 through wire 24, through wire 28, through field coil 26, through wire 30, through ballast resistance 32, through wires 34 and 36, through control resistance 38, which may be variable according to the usual practice, and through wires 40, 42 and 14 back to the armature of generator 12. Except for the use of the two resistances 32 and 38 in place of one resistance, this circuit is similar to the customary shunt field circuit.

With such a circuit alone, the generator is slow in building up as the field is very weak at the start. To overcome this, it is customary to provide some means for initially exciting the field. This invention contemplates a simple means of doing so with a small battery, such as used in ordinary lighting circuits, and of also charging said battery by the field current after the generator has been sufficiently built up. For this purpose, relay 44 has been provided which is preferably connected by wires 45 and 47 in parallel to the field coil 26 but may be connected in series. When the motor and generator are idling, comparatively little current flows through the relay 44 and so its armatures 46 and 48 are in their lower positions, making connection with the back contacts 50 and 52. The battery 54 is thus connected in series with field 26 and in such manner as to boost the current therethrough.

The boosting circuit is as follows: From the positive side of the battery 54 through wire 100

56, armature 48, back contact 50, wires 58, 60, 62, 64 and 30, field coil 26, wires 28 and 24 to the negative terminal of the armature of generator 12, from the corresponding positive terminal through wires 14, 42 and 40, resistance 38, wires 36, 34 and 66, back contact 52, armature 46, the wire connected therewith, switch 70 and wire 72 to the negative side of the battery 54. Thus the armature of generator 12 and battery 54 work together to force the current through the generator field coil 26 to excite the generator field until the generator builds itself up to a suitable voltage. The constants of the relay 44 are such that when the generator reaches such voltage, which may be about thirty-six volts, the relay 44 becomes sufficiently energized to raise the armatures 46 and 48. These armatures, together with their connections, constitute a pole changing switch which reverses the connections with the battery so that instead of boosting the flow of current through the field coil, the battery is charged by that current.

The charging circuit is the same as the boosting circuit from the positive side of the armature of the generator 12 to wire 66, but from there it extends through the other contact 74, through the armature 48 and wire 56 to the positive side of battery 54, through the battery, through wire 72, switch 70, the above connecting wire, armature 46, front contact 76, wires 78, 62, 64 and 30, and through the field coil back to the generator armature in the usual way.

To prevent the generator from breaking down when the armature is shifting from the back contacts to the front contacts, a shunting ballast resistance 32 is connected between the wires 30 and 34. This provides a shunt across the battery.

One characteristic of shunt-wound generators is that the voltage falls off as the ampere load gets larger. On an extremely heavy load, the voltage gets so low that it cannot sufficiently excite the field with the result that the generator breaks down. The present invention overcomes this defect by again reversing the battery connections to boost the field voltage before the voltage lowers to the critical breaking-down point. The constants of the relay 44 are such that when the voltage across the field coil 26 drops for example to eighteen volts, the armatures 46 and 48 are dropped, again reversing the connections to the battery 54.

The switch 70 may be provided in the battery circuit, to be opened automatically when the engine and generator are idling so that there will not be a waste of battery current. The switch 80 may be provided to shunt the resistance 38 if desired.

The operation of the apparatus is as follows: To start the car, the engine is sped up, the switch 70 is closed, closing the boosting circuit of battery 54 to excite the field coil 26 and to increase the excitation thereof as the engine speeds up. When the voltage reaches the desired value, relay 44 is operated to reverse the connections of the battery 54 so that the battery is charged by the field current. This charging is accomplished without any loss of power as the customary resistance 38 may be decreased sufficiently to offset the effects of the added resistance and opposed voltage of the battery.

In the modification shown in Figure 2, the resistance 32 is not connected to shunt the battery until the field excitation has reached a desired value, for example, that at which it is desired to reverse the connection of the battery. This is accomplished through the use of an additional relay 86. This relay is preferably a slow releasing relay and is connected across the field coil 26. When the relay is sufficiently energized, armature 88 is caused to complete the circuit through shunt resistance 32, and armature 90 completes the circuit through relay 44 across the field coil 26. Since the relay 44 is not connected until the resistance 32 is connected, the relay 44 cannot be energized sufficiently to move the armatures 46 and 48 until after the shunt resistance 32 has been made effective to prevent breaking down of the generator.

The constants of the two relays 44 and 86 should be such that the voltage necessary to hold the armatures of the relay 44 is at least as high as that necessary to hold the armatures of the relay 86. Should there be a sudden drop in voltage across the generator field coil 26, the relay 44 will be deenergized at least as soon as the relay 86 ceases to be externally energized, but as the relay 86 is of a slow releasing type, it will retain its armatures until after the armatures 46 and 48 of relay 44 have dropped to reverse the polarity changer so that the battery 54 will boost the voltage in the field circuit.

Relay 86 may be given such constants as will cause it to pick up its armatures at a voltage considerably below that at which relay 44 picks up, and to drop them at as near as possible to the same voltage. It would be desirable to have the resistance connected whenever current would flow therethrough in a field boosting direction.

The operation of the apparatus of Figure 2 would then be the same as that of the apparatus of Figure 1, except that the resistance 32 would be connected when the generator had built itself up sufficiently to prevent a serious drain on the battery through the shunt resistance. The battery would then remain connected in boosting relation until the generator built itself up fully to the voltage at which the connections would be reversed in the apparatus of Figure 1. As the voltage of the generator drops, the polarity of the battery connections would again be reversed at about eighteen volts, as in the apparatus of Figure 1, and the resistance 32 would so remain connected until the voltage across the field coil was so low as to fail to hold the armatures of relay 86. This would preferably be before the current flow was such that the resistance 32 drained the battery uselessly.

There are of course numerous other connections which may be made to accomplish the desired results; for example, a device might be connected in such relation with resistance 32 as to positively and directly prevent current flowing through that resistance except in a direction which is useful in building up the field of the generator 12.

It is to be understood that many other embodiments of the invention, including some in improved form, will be apparent and in the course of time will be devised by those skilled in the art. My invention includes all of these which come within the spirit of the following claims, construed as broadly as the prior art will permit.

I claim:

1. The combination of a generator including a shunt-wound field coil, a battery, and means to connect the battery alternately to boost the voltage across the generator field coil and be charged by the electricity passing through said field coil.

2. The combination of a generator including a shunt-wound field coil, a battery, connections whereby the battery boosts the current flowing through said field coil, and means to change the connections so that the battery is charged by the current generated by said generator.

3. The combination of a generator including a shunt-wound field coil, a relay connected across said coil, a polarity changing device controlled by said relay, a battery, said battery and field coil being so connected to said polarity changing device that when the polarity changing device is in one position, the battery boosts the flow of current through said field coil, and when said device is in another position, the battery is charged by current flowing through said field coil.

4. The combination of a generator including a shunt-wound field coil, a relay connected across said coil, a polarity changing device controlled by said relay, a battery, said battery and field coil being so connected to said polarity changing device that when the polarity changing device is in one position, the battery boosts the flow of current through said field coil, and when said device is in another position, the battery is charged by current flowing through said field coil, and a resistance shunted across said polarity changer and battery when it is in either of said positions.

5. The combination of a generator including a shunt-wound field coil, a relay connected across said coil, a polarity changing device controlled by said relay, a battery, said battery and field coil being so connected to said polarity changing device that when the polarity changing device is in one position, the battery boosts the flow of current through said field coil, and when said device is in another position, the battery is charged by current flowing through said field coil, and a shunt connected across said polarity changer whenever it is in neither of said positions.

6. The combination of a generator including a shunt-wound field coil, a battery connected in series with said field coil, and means for reversing the connections of said battery.

7. The combination of a generator including a shunt-wound field coil, a battery connected in series with said field coil, means for reversing the connections of said battery, and a resistance shunted across said means while it is operating to reverse the connections.

8. A generator including a shunt-wound field coil, a resistance and a battery each adapted to be connected in series with said field coil and to furnish separate paths for current to pass between a single point and said field coil, means for so connecting said resistance, and separate means for reversing the connections of said battery.

9. A generator including a shunt-wound field coil, a resistance and a battery each adapted to be connected in series with said field coil and to furnish separate paths for current to pass between a single point and said field coil, means for so connecting said resistance, and separate means for reversing the connections of said battery, said last named means being operable only when the resistance is connected.

10. The combination of a generator including a shunt-wound field coil, a shunt and a battery each adapted to be connected in series with said field coil, said shunt when connected being in parallel with said battery, means responsive to a certain voltage across said field coil for connecting said shunt, and means for only thereafter reversing the connections of said battery.

11. The combination of a generator including a shunt-wound field coil, a shunt and a battery each adapted to be connected in series with said field coil, said shunt when connected being in parallel with said battery, means responsive to a certain voltage across said field coil for connecting said shunt, and means responsive only thereafter to a voltage at least as high for reversing the connections of said battery.

12. The combination of a generator including a shunt-wound field coil, a battery, and means for connecting said battery in series with said field coil in boosting relation under certain conditions and in charging relation under other conditions said other conditions including the presence of a certain voltage across said field coil.

13. The combination of a generator including a shunt-wound field coil, a battery, connections adapted to connect said battery in series with said field coil in both boosting relation and in charging relation, and means responsive to the generation of a certain voltage by said generator to shift said connections from one relation to the other.

14. The combination of a generator including a shunt-wound field coil, a battery, connections adapted to connect said battery in series with said field coil in both boosting relation and in charging relation, means responsive to the generation of a certain voltage by said generator to shift said connections from one relation to the other, a resistance adapted to be connected in parallel with said battery and connections, and means tending to prevent the flow of current through said resistance when the direction of flow would be such as not to boost the excitation of the field.

15. The combination with a generator including a shunt-wound field coil, of a battery, polarity changing switch for selectively connecting the battery in series with the field coil in charging relation and in boosting relation, and means responsive to the generation of a certain voltage by said generator to operate the polarity changing switch.

16. The combination with a generator including a shunt-wound field coil, of a battery, polarity changing switch for selectively connecting the battery in series with the field coil in charging relation and in boosting relation, and means responsive to the same electrical influences as is the field coil to operate the polarity changing switch.

17. The combination with a generator including a shunt-wound field coil, of a battery, a polarity changing switch for selectively connecting the battery in series in boosting and in charging relation with the field coil, a resistance shunt across said switch, a relay shunted across the field coil and adapted to operate said switch at a predetermined voltage across the field coil.

18. The combination with a motor for driving a vehicle and a generator for supplying said motor with current, said generator including a shunt-wound field coil, of a battery, a polarity changing switch for selectively connecting the battery in series in boosting and in charging relation with the field coil, a resistance shunt across said switch, a relay shunted across the field coil and adapted to operate said switch at a predetermined voltage across the field coil.

19. The combination of a generator including a shunt-wound field coil, a shunt and a battery each adapted to be connected in series with said field coil, said shunt when connected being in parallel with said battery, means responsive to the generation of a certain voltage by said generator for connecting said shunt, and means for only thereafter reversing the connections of said battery.

20. The combination of a generator including a shunt-wound field coil, a shunt and a battery each adapted to be connected in series with said field coil, said shunt when connected being in parallel with said battery, a slow release relay responsive to the generation of a certain voltage by said generator for connecting said shunt, and means for only thereafter reversing the connections of said battery.

21. A generator having an excitation system including a shunt connected field exciting winding and a battery, and means including a current controlling device for connecting said battery in series with said exciting winding for providing auxiliary excitation of said winding, said means being responsive to the generator voltage for reversing the battery connections for causing charging of said battery by field exciting current from said generator.

22. In an electrically propelled vehicle including a prime mover and a shunt generator driven thereby, a motor connected to said generator for propelling the vehicle, an auxiliary excitation system for the shunt generator for effecting rapid acceleration of the vehicle comprising a battery, and a relay responsive to the voltage of said generator for connecting said battery in series with the shunt field exciting winding of said generator for providing auxiliary excitation of said winding and for reversing the battery connections in said field winding for causing charging of the battery when the generator voltage reaches a predetermined value.

Signed at Chicago, Illinois, this 19th day of April, 1930.

WARD THORNE.